Figure 1:
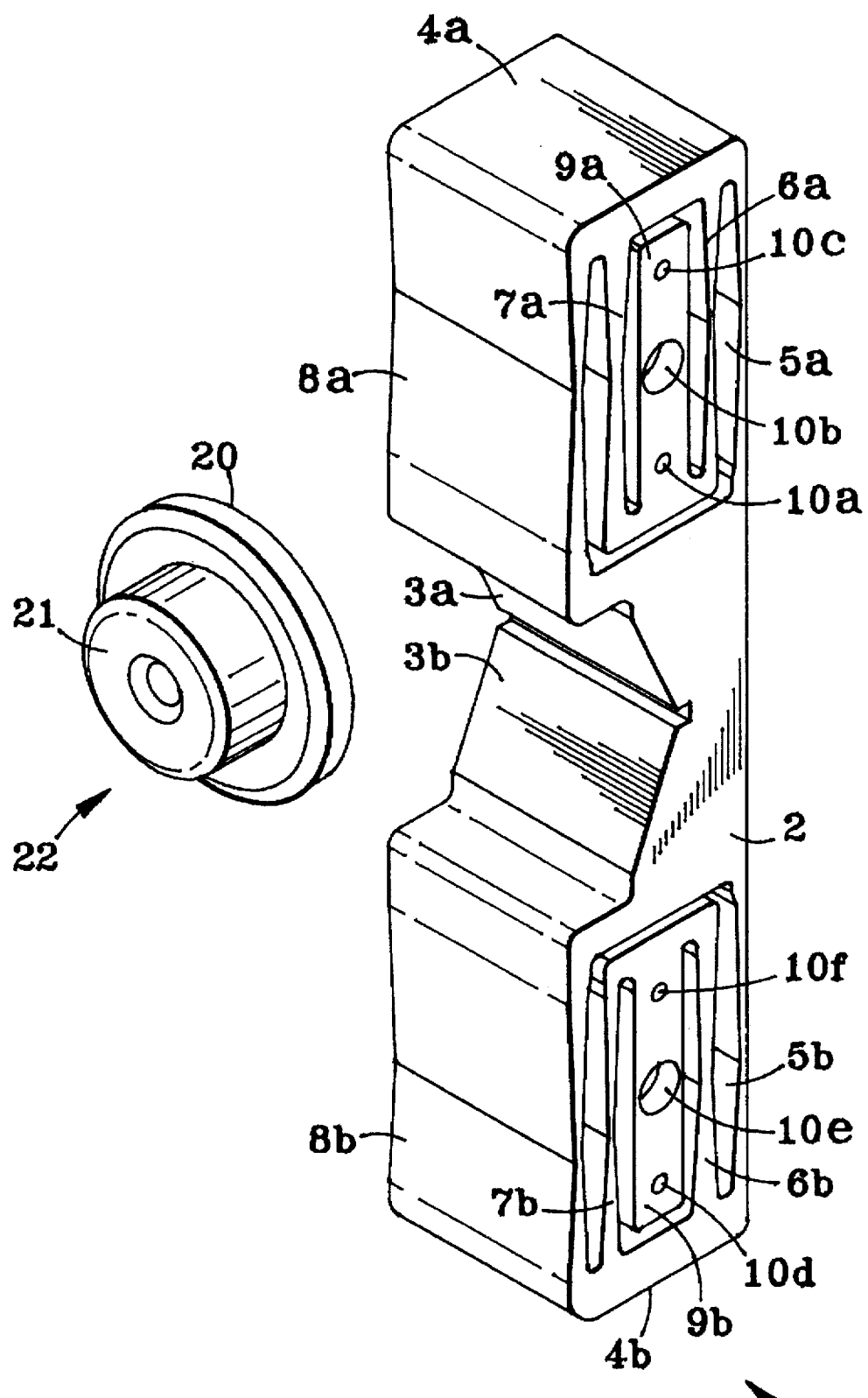

United States Patent [19]
Slocum et al.

[11] Patent Number: 5,678,944
[45] Date of Patent: Oct. 21, 1997

[54] FLEXURAL MOUNT KINEMATIC COUPLINGS AND METHOD

[75] Inventors: Alexander H. Slocum, Bow, N.H.; Luis Muller, Cambridge; Daniel Braunstein, Somerville, both of Mass.

[73] Assignee: AESOP, Inc., Concord, N.H.

[21] Appl. No.: 568,612

[22] Filed: Dec. 7, 1995

[51] Int. Cl.⁶ .................................................. F16B 1/00
[52] U.S. Cl. .................................................. 403/13; 403/291
[58] Field of Search .......................... 403/291, 13, 362, 403/52, 76, 71

[56] References Cited

U.S. PATENT DOCUMENTS

| | | | |
|---|---|---|---|
| 3,420,582 | 1/1969 | Shelley | 403/291 |
| 3,871,778 | 3/1975 | Schulte et al. | 403/52 |
| 3,957,316 | 5/1976 | Armitage | 403/291 |
| 4,367,591 | 1/1983 | Hirabayshi et al. | 403/52 X |
| 4,987,526 | 1/1991 | Slocum et al. | 364/167.01 |
| 5,069,413 | 12/1991 | Carson et al. | 248/638 |
| 5,213,436 | 5/1993 | Fichtner et al. | 403/291 X |
| 5,259,710 | 11/1993 | Charles | 409/235 |

Primary Examiner—Anthony Knight
Attorney, Agent, or Firm—Rines and Rines

[57] ABSTRACT

A novel flexural mount kinematic coupling apparatus and technique in which a pair of surfaces is deterministically kinematically coupled with repeatable accuracy of positioning with respect to one another and an intermediate plane between, and with guided compliance provided by flexural, rolling or sliding bearing elements to permit translational clamping in a direction normal to the plane that brings the surfaces into contact without positional error motions between the surfaces.

15 Claims, 4 Drawing Sheets

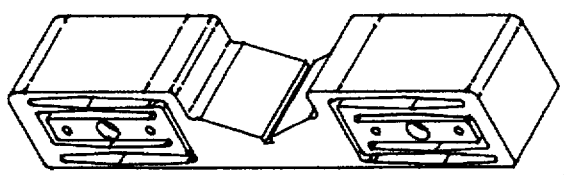
FIG. 2a
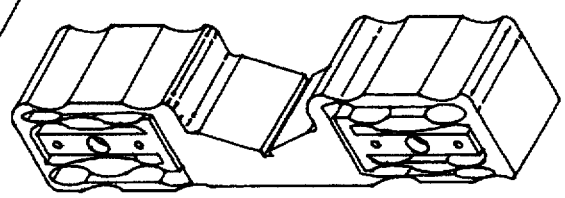
FIG. 2b
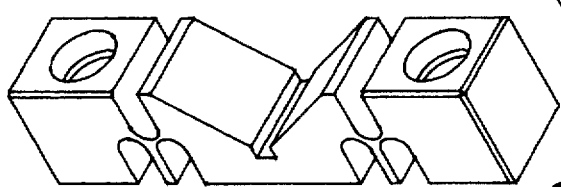
FIG. 2c
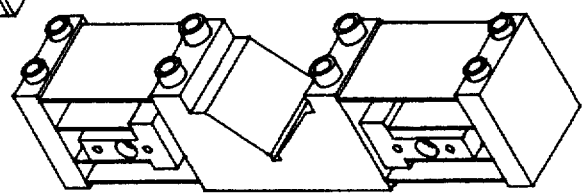
FIG. 2d
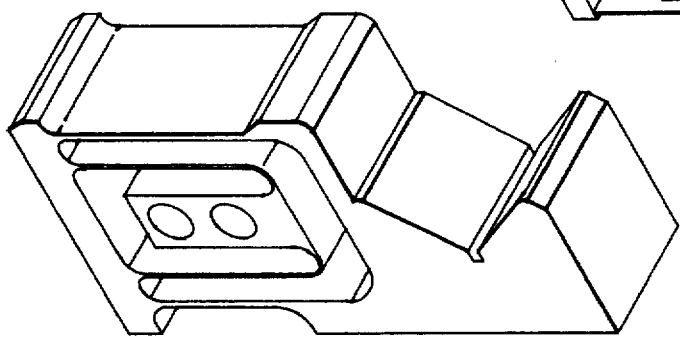
FIG. 2e
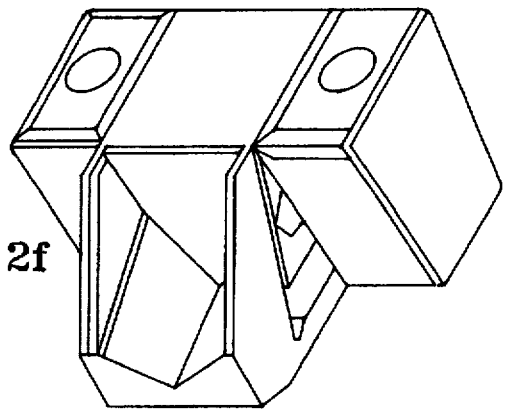
FIG. 2f
FIG. 2g
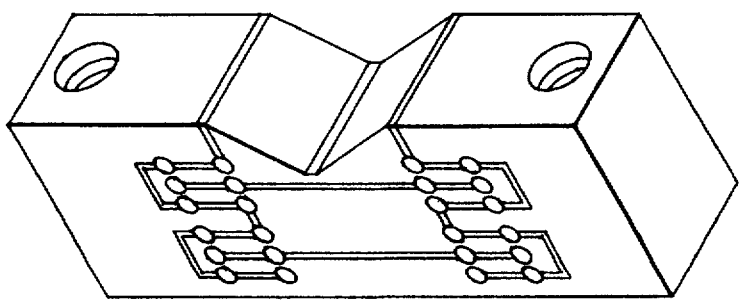

FLEXURAL MOUNT KINEMATIC COUPLINGS AND METHOD

The present invention relates to the guided mating of parts or surfaces with one another with accurate repeatability, being more particularly directed to the provision of deterministic kinematic coupling mechanisms and techniques and to improvements therein that, once the parts or surfaces are coupled along a plane, enable guided compliance into contact with one another in a direction normal to the plane of coupling.

BACKGROUND

There are many systems where two parts or surfaces must be mated with a very high degree of planar repeatability, while allowing the part surfaces to come into intimate contact. This has been traditionally accomplished with the use of two pins that mate with a circular hole and a slot, respectively. While widely used, the problem with this concept, however, is that there must be some clearance between the pins and the features into which they are inserted, which, in practice, results in a repeatability on the order of about 20 micrometers.

Kinematic couplings have long been known to be able to provide sub-micrometer repeatability because they use spherical surfaces (e.g., hemispheres) anchored to one part or surface to mate with three centrally pointing grooves in another part or surface. This provides six points of contact which, both mathematically and practically, deterministically defines the six degrees of freedom needed to define the position and orientation of one part or surface with respect to another.

There are few patents which relate to the novel use of kinematic couplings. Kinematic couplings have been used extensively in many applications through time to precisely and repeatably position, in six degrees of freedom, two elements with respect to one another. We found no prior art, (particularly in the area of couplings and optical mountings) in which the kinematic coupling mechanism provides, integral to the mechanism itself, ability to adjust position along one axis of each kinematic leg after the ball has seated in the groove to initially establish the position of one body with respect to the other. This invention's ability to do so completely differentiates it from any prior art.

An early example of prior art is 849,514 (Tabor and Lewis), which shows a three-legged support for molder's flasks. In that patent, the three support surfaces of a lower structure receive ball-shaped elements from an upper structure and retain them in alignment. However, the actual method by which the upper structure's balls "settle in" onto the lower structure's receiving surfaces is resident in a wholly separate part of the device (the spring-loaded center column). All subsequent inventions using kinematics to place one object relative to another are analogous in that the coupling does not have ability, within itself, to move along one axis to draw the ball (or groove) and its attached structure into the groove (or ball, respectively). The present invention's characteristics enable this to occur.

An example of more recent prior art is U.S. Pat. No. 4,574,625, assigned to Federal Products Corp., which shows a kinematic coupling used to mount a measurement probe to a holder with the use of a magnet to preload and hold the coupling together. This gives high stiffness but lets the coupling release the probe should the probe be struck. This prevents damage to the probe. However, this patent does not allow for a soft engagement of the probe in the coupling, nor does it allow one body to continue to move in one direction after it is kinematically engaged.

Such ball and groove kinematic couplings have been used in a myriad of applications whereby two mechanical elements must be coupled together with high accuracy and repeatability, as described, for example, by co-applicant A. H. Slocum in *Precision Machine Design*, Prentice Hall, Englewood Cliffs. N.J., 1992, and in "Design of Three-Groove Kinematic Couplings," *Precision Eng.*, Vol. 14, No. 2, April 1992, pp 67–76. These couplings are deterministic in that the mating parts make contact at a number of points equal to the degrees of freedom being constrained. To constrain two mating parts or surfaces in three dimensional space, for example, six points of contact are needed to constrain three translational degrees of freedom and three rotational degrees of freedom. Three balls, each sitting in a groove, will accomplish this task since, for each ball and groove, there exist two points of contact. It should be noted, however; that this design will not allow the parts or surfaces to move towards one another to also make intimate contact between them such as would be required, for example, in applications like a vacuum chamber seal to mate flat with the chamber, or for a stencil frame to mate with a solder paste dispensing machine, or the like. What is needed, therefore, is a new method for allowing the kinematic coupling to establish, for example, three degrees of freedom, X, Y, and yaw, while allowing for three degrees of freedom to be unrestrained, Z and pitch and roll; or variations of these degrees of freedom. It is to the solution of this problem, accordingly, that the present invention is directed.

The invention, indeed, provides for a high degree of planar positional repeatability, while allowing for motion normal to the plane of repeatability through the use of a deterministic kinematic coupling that has guided compliance in the direction normal to the plane of coupling. This is achieved with a set of three spherical shapes on one mechanical part or surface, where each spherical shape mates at two points with a groove in another mechanical part or surface, and in which groove or ball elements or combinations thereof are attached to flexural bearings that allow the adjacent parts or surfaces to move in a direction normal to the plane of coupling. A key element of the design is the location of the guiding flexures such that the forces from the coupling action act on the flexures in a manner that causes pure translation without parasitic error motions. In a similar embodiment of the invention, the grooves of the kinematic coupling are fixed, and the spherical shapes are located in a limited range of motion press-fit die-set bushing to also allow for motion normal to the plane of coupling, while allowing for greater range of motion and higher transverse loads.

OBJECTS OF THE INVENTION

An object of the present invention, accordingly, is to provide a kinematic coupling apparatus and method for deterministically and very repeatably locating two components, bodies, parts or surfaces (hereinafter generically referred to as "surfaces") with respect to one another in a plane, but held at a distance apart, and then, with the application of a translational guided clamping force, allowing the surfaces to come into contact with one other while maintaining precise relative planar location between one other.

A further object is to provide for accurate translational clamping or movement, without lateral or inclinational errors, so as first to locate the two surfaces with respect to each other and a plane therebetween, and then to allow the surfaces to be brought into intimate contact.

Still another object of the invention is to allow two surfaces to be precisely located with respect to each other along an intermediate plane, and then brought together into intimate contact and clamped together while still being held in precise location even though clamping forces may have resulting components that would otherwise misalign the components.

A further objective of the invention is to use flexural or rolling or sliding bearing elements to allow for the translational motion of one set of such precision kinematic coupling elements that locate one surface with respect to another and therefore allow the surfaces to be located and then brought into intimate contact, without allowing error motions to occur between the two surfaces.

Other and further objects will be explained hereinafter and are more fully delineated into the appended claims.

SUMMARY

In summary, the invention embraces kinematic coupling apparatus for precisely and repeatably adjacently locating a pair of surfaces with respect to one another and with respect to an intermediate coupling plane separating the surfaces, the apparatus having, in combination, mating balls and grooves respectively carried by the adjacent surfaces for kinematically coupling the surfaces with precision and repeatability at predetermined relative positions along said plane through sufficient points of contact between the balls and grooves to constrain the surfaces in the X and Y directions within said plane, and with the surfaces held separated from one another in the Z direction; and one of the surfaces being translatably and guidingly movable purely in the Z direction, there being provided one of flexural, rolling and sliding bearing elements adapted to enable the surfaces to be clamped into intimate contact with one another in response to beating-controlled translational movement in the Z direction, while maintaining the X, Y locations of the surfaces free of positional and parasitic error motions between the surfaces.

The invention, thus, is concerned with using a kinematic coupling precisely and repeatably to locate one component surface with respect to another component surface with the surfaces separated by a small distance, and then, with the application of a preload force, to compress one set of the kinematic coupling elements, (for example, grooves or balls that mate with the grooves) with pure linear motion to allow the component surfaces to come into intimate contact with one other, while still precisely holding the other five degrees of freedom location between the two component surfaces.

Preferred and best mode embodiments are hereinafter described.

DRAWINGS

Figures 3A, 3B, 3C:
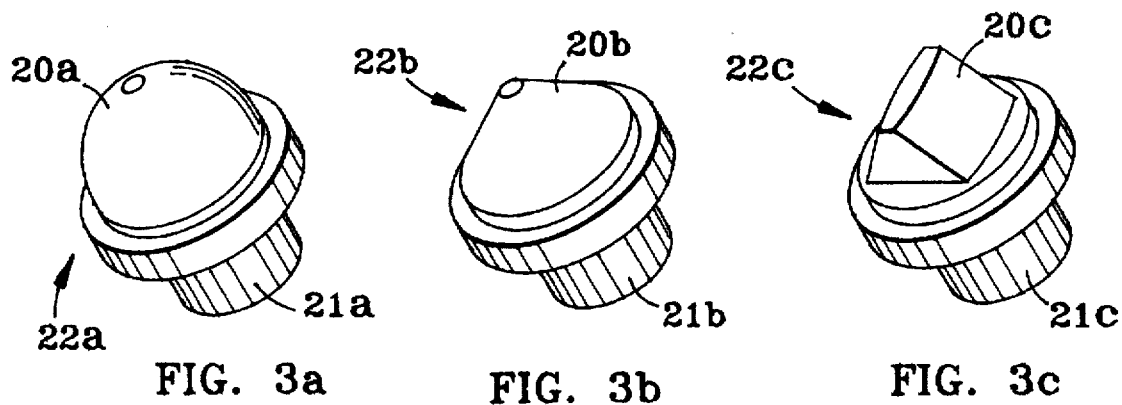
Figure 4:
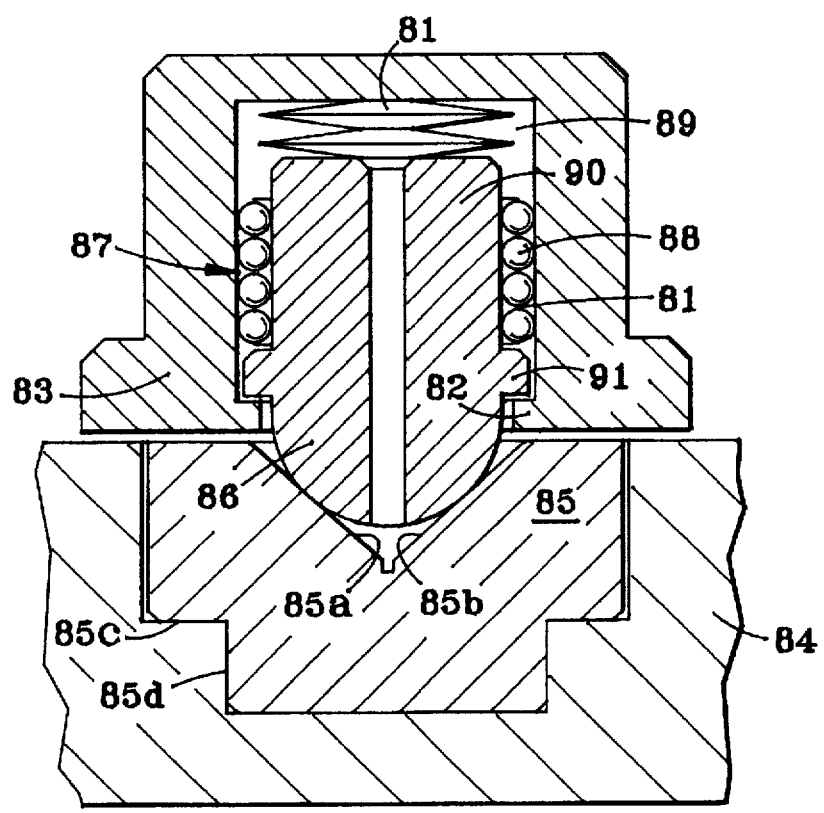
Figure 5:
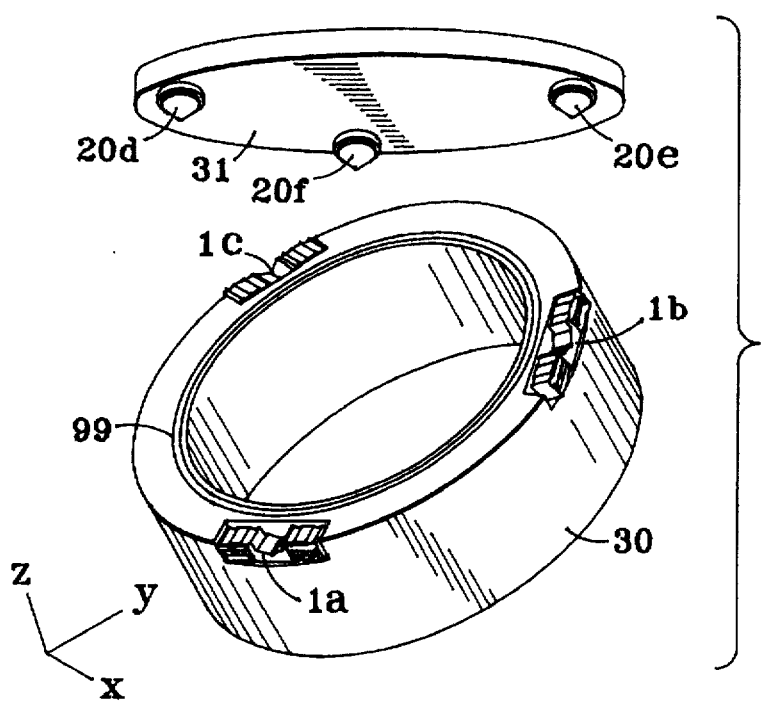
Figure 6:
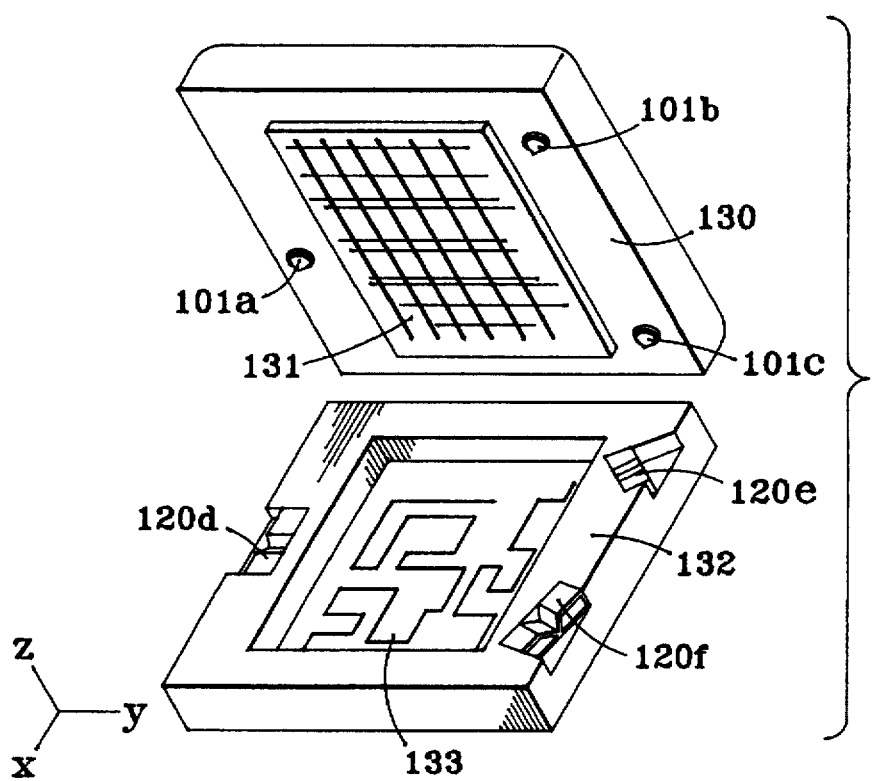

The invention will now be described with reference to the accompanying drawing in which:

FIG. 1 is a perspective view of a monolithic flexural kinematic coupling groove constructed in accordance with the invention that allows for accurate translational motion, with mating crowned cone;

FIGS. 2(a)–(g) present perspective views of a number of different types of flexure bearings that can be used to obtain the flexural kinematic coupling action of FIG. 1;

FIGS. 3(a)–(c) show three perspective views of a) a crowned cone kinematic coupling element, b) a spherical kinematic coupling element, c) a compound radius of curvature kinematic coupling element;

FIG. 4 is a cutaway view of a kinematic coupling spherical element that is located in a precision bore where it is linearly guided by a die-set bushing, and spring preloaded;

FIG. 5 is a perspective view of an illustrative application of the invention exemplarily shown as for use in a vacuum chamber, illustrating how flexural bearing supported grooves in the chamber are positioned to mate with and locate the vacuum chamber surface lid, such that when a preload force is then applied, the lid will have a precision location with respect to the chamber body while allowing the lid to come into intimate contact with the vacuum seal, and then as the vacuum is drawn, the location of the lid with respect to the chamber will be maintained; and FIG. 6 is a perspective view of another illustrative application or use of the invention in the before-mentioned stencil frame use as for printing solder paste onto a circuit board, where the stencil frame has three hemispherical ball elements mounted in it that then kinematically mate with three flexural element mounted kinematic grooves in the base, such that the stencil can be precisely located with respect to the base, and then clamped in place to contact the entire perimeter of the stencil frame with the machine base.

PREFERRED EMBODIMENT(S) OF THE INVENTION

This invention, as above explained, achieves its objectives by establishing the relative position of two adjacent mating surfaces with kinematic couplings while translationaly guiding one set of kinematic coupling elements with, for example, flexural beatings or linear bearings. Properly designed flexural, rolling element, or sliding element bearings with either inherent or added spring elements, will permit the required pure translational motions and maintain high stiffness in the other five degrees of freedom where motion is not desired. An externally applied preload force then compresses the spring elements and preloads the spring elements until the two surfaces of the mating parts contact each other, at which point the preload force is transferred to the surface interface, while the relative position of the two surfaces is still very precisely maintained.

FIG. 1 shows a flexure mounted groove 1 with which a spherical element 22 is to mate, and three such pairs would be used to form a kinematic coupling uniquely to define the relative position of two components with respect to one other. In this case, however, it is desired first to establish the planar location (X,Y) and yaw (rotation about an orthogonal Z axis) between the surfaces and then bring them into intimate contact to form a seal or otherwise face-type contact. This is illustrated, for example, in FIG. 5 where a lid 31 has three such spherical kinematic coupling elements 20d, 20e, and 20f that will mate with flexure mounted grooves 1a, 1b, and 1c which are mounted to base 30. After the lid 31 is located with respect to the base 30 by the spherical elements 20d, 20e, and 20f contacting the groove elements 1a, 1b, and 1e, clamping means, schematically represented at C and well-known to those skilled in the art, would be used to pull the lid 31 down to make contact with the seal 99 in the base 30. A vacuum could then be dram inside the chamber. Among the reasons for such precise control of the position of the lid with respect to the base, is that the lid may have precision instruments and sensors on it, and they must be repeatably be returned to position after the lid is opened and then closed again.

It should be noted that in FIG. 1, the flexure is in the form of triangular elements 5a, 6a, 7a, 8a and 5b, 6b, 7b, and 8b when viewed from the edge. There are other shapes that can be used such as hourglass shapes and simple flat shapes, but it has been found that the triangle shape shown here provides a lot of motion in the direction of the flexure while providing a high degree of axial stiffness in the lateral direction.

FIG. 6 shows another illustrative application with the same needs, where a stencil 131 mounted in a frame 130 is to be precisely located with respect to a platten 132, such as used to hold a circuit board, and then preloaded against the platten (or circuit board) so it is in intimate contact. This is accomplished by mounting three spherical contact points 101a, 101b, and 101c, shown here as the crowned cones 22b from FIG. 3, into the frame 130. The platten 132 has in it three flexure mounted vee grooves 120d, 120e, and 120f. These vees are angled so that typically the vee shape lies along a line that bisects the angle formed from an imaginary triangle that joins all three vees. When the frame 130 is then placed onto the platten 132, crowned cones 101a, 101b, and 101c mate with grooves 120d, 120e, and 120f, respectively. In this state, the surfaces of the frame and platten are not touching, but their relative position is exactly and repeatably defined. The application of a clamping force C, such as by a toggle clamp or piston or other means currently used by those skilled in the art, will cause the flexural mounted grooves 120d, 120e, and 120e to deflect in a pure vertical mode so the surface of the stencil 131 will come into intimate contact with the surface of the circuit board 133 while still maintaining perfect alignment. This is critical for stencil-to-part pattern transfer operations.

Returning to FIG. 1, the spherical seat 22 may be made in many well-known ways. Here the element 22 has a stem 21 that would be press-fit into a precision hole in the part. The spherical seat 20 may be a true sphere, or for enhanced load capacity it may have a part-spherical crowned cone shape to minimize Hertzjan stresses. These types of Hertz stress calculations are discussed in the above reference by Slocum. In order to allow the coupling precisely to locate the components, the spherical element 22 will make contact with the groove element 1 in the vee groove with sides 3a and 3b. The groove element 1 shown here has flexural elements that provide a spring force to support the weight of the component, but will allow the component to be lowered down with the application of a preload force. This is accomplished with the use of a double flexure, but other flexural designs can be used by those skilled in the art of flexural bearing design. The flexure has mounting surfaces 9a and 9b that have pin hole pairs 10d and 10f and 10a and 10c, respectively. These holes are used to pin the flexure to the surface to which it is to be mounted (for example, using spiral pins), so that when bolts are inserted in holes 10e and 10b and tightened, torque is not transmitted to the flexure which may twist it.

As shown in FIG. 1, to the mounting blocks 9a and 9b are provided sets of flexural beam elements 6a and 7a and 6b and 7b, respectively. These flexural beam elements are connected to outer floating blocks 4a and 4b, respectively. With this four bar parallel linkage arrangement, outer blocks 4a and 4b can move in the Z direction restrained only by the cantilever bending restraint from flexural beam elements 6a and 7a and 6b and 7b, respectively. Blocks 4a and 4b are in mm connected to the vee groove 2 by flexural beam elements 5a and 8a and 5b and 8b, respectively. This compound flexural bearing arrangement allows for relatively large pure translational motion of a flexural element supported stage. The novel use here is to support a kinematic coupling groove, such that it precisely guides and locates the spherical element 22 into position to make contact with the groove 2, and then allow the coupled system to translate without error motion.

In this representation, the vee groove 2 has its sides 3b and 3a ground such that the points where the mating elements will make contact are in line with the mounting holes 9a and 9b. In this symmetric loading configuration, desired but not required, greater positioning repeatability is obtained because it tends to put less twisting moments on the flexure, since lateral (X direction) forces are shared equally by all the flexural beam elements.

There are many different types of flexural bearings that can also be designed to achieve the pure vertical motion desired, as shown in FIGS. 2(a)–(g). Others can also be envisioned by those skilled in the art of flexural bearing design to achieve accurate motion with minimal parasitic error motions, as discussed in detail in said Slocum reference book *Precision Machine Design*.

FIGS. 3(a)–(c) show three different types of essentially spherical elements that can be used to mate with the grooves. FIG. 3(a) shows a spherical element 22a where the base 21a would be a cylinder that would be pressed into a hole on the body to which it would be attached. The spherical end 20a would typically have a radius, for example, of about 25 mm, giving a load capacity for an Rc62 steel element in a Rc62 steel groove of 2.4 kN.

For greater load capacity, the crowned spherical element 22b of FIG. 3(b) would be useful where the base 21b is a cylinder pressed into a hole on the body to which it is attached. The crowned cone 20b may have radii, for example, of about 25 mm and 250 mm, giving a load capacity for an Rc 62 steel element in a Rc 62 steel groove of 16.5 kN.

For even greater load capacity, FIG. 3(c) shows a crowned element 22c where the base 21c is a cylinder pressed into a hole on the body to which it is attached. The double crowned surface 20c would have radii for example of 250 mm giving a load capacity for an Rc62 steel element in a Rc62 steel groove of 241 kN.

Thus, given the appropriate flexural spring strength, even the heaviest of loads can be supported, including those found in the die-stamping industry. To address the case where a flexural system may not be feasible, FIG. 4 shows a design where the spherical element 86, such as the high load capacity element of FIG. 3c, is the moving element, and the groove 85 is the fixed clement anchored in component 84. Here, the spherical element 86 is formed in the end of the shaft 90 and located in a precision bore 89 with a die-set bearing 87 which is made from a cylindrical retainer sleeve 81 loaded with many rolling ball elements, such as at 88. When the cylinder 90 is first loaded with the die-set bushing 86 and pressed into the bore 89 in component 83, some scoring of the walls may occur as the balls cold-form grooves in the bore, but this will not harm the function and actually serves to keep the unit properly rotationally oriented, particularly in the case where a double crown is used as shown in FIG. 3c. The cylinder 90 has a flange 91 which contacts a snap ring 82 that keeps the unit from being pushed out of the bore by preload spring 81, such as a coil, washer-stack, elastomer, or gas-type of spring unit. This serves as the spring element that is compressed when the coupling is clamped to force the coupled surface elements 83 and 85 to make intimate face contact after first being precisely located in the XY plane by the kinematic coupling.

The die-set bearing 87 acts as a rolling element bearing to provide guidance to the cylinder 90, with rounded end 86 mating with a grooved component 85. In some applications, moreover, where low cost may be of prime concern and accuracy not so critical, a sliding contact bearing may be used (e.g., a precision ground cylinder sliding in a close-fit bore). The encasing cylinder 83 would be pressed into a bore in a component, such as the lid 31 of FIG. 5. The vee block 85 with contact surfaces 85a and 85b is pressed into a mating structure, such as the before-described vacuum chamber base 30 in FIG. 5. Press-fit contact is made at interface 85d and 85c which provides a stable and rigid connection. Now, as the lid 31 is lowered onto the chamber 30, the vees are rigid, but the crowned cones are vertically compliant. The decision as to which member should be compliant will typically be based on cost, depending on the design and the manufacturing capability of the user.

Other applications of the invention include use on systems that require precise alignment and modest force retention, but must have the ability to release under high load. Such applications include snowboard bindings, where the kinematic coupling defines the position of the boot, and spring or lever-type clamps hold and preload board-mounted spheres on balls into binding-mounted grooves or binding balls in board grooves. The flexure may be supported by a spring such that when the leg is over stressed, the spring is compressed and the coupling releases.

Further modifications of the invention will also occur to persons skilled in the art, and all such are deemed to fall within the spirit and scope of the invention as defined in the appended claims.

What is claimed is:

1. Kinematic coupling apparatus for precisely and repeatably adjacently locating a pair of surfaces with respect to one another and with respect to an intermediate coupling plane separating the surfaces, the apparatus having, in combination, mating balls and grooves respectively carded by the adjacent surfaces for kinematically coupling the surfaces with precision and repeatability at predetermined relative positions along said plane through sufficient points of contact between the balls and grooves to constrain the surfaces in the X and Y directions within said plane, and with the surfaces held separated from one another in the Z direction; one of the surfaces being translatably and guidingly movable purely in the Z direction, there being provided one of flexural, rolling and sliding bearing elements adapted to enable the surfaces to be clamped into intimate contact with one another in response to bearing-controlled translational movement in the Z direction, while maintaining the X, Y locations of the surfaces free of positional and parasitic error motions between the surfaces.

2. Kinematic coupling apparatus as claimed in claim 1 and in which spring means is provided compressible to force said intimate contact during the clamping of the surfaces.

3. Kinematic coupling apparatus as claimed in claim 2 and in which the spring means is pre-loaded.

4. Kinematic coupling apparatus as claimed in claim 1 and in which three substantially spherical ball elements are provided on one surface and groove elements on the other surface, with each ball element mating at two points within a groove element.

5. Kinematic coupling apparatus as claimed in claim 4 and in which the bearing elements are attached to one of the ball and groove elements.

6. Kinematic coupling apparatus as claimed in claim 1 and in which the surface provided with a flexural kinematic coupling groove mates with one of a crowned cone type ball element, a spherical element, and a coupling element of compound radius of curvature.

7. Kinematic coupling apparatus as claimed in claim 1 and in which one surface comprises a frame for mating with a platten or board, the frame surface being provided with three spherical contact points for mating with three flexure mounted grooves on the platten or board, and in which clamping means is provided, operable after the frame is located with respect to the platten or board, but not touching, by the spherical points contacting the grooves, for forcing the frame into sealing contact with the platten or board.

8. Kinematic coupling apparatus as claimed in claim 7 and in which the contact points are formed by a cylinder pressed into a hole in the frame and provided with a spherical end.

9. Kinematic coupling apparatus as claimed in claim 7 and in which the grooves are of vee-shape.

10. Kinematic coupling apparatus for precisely and repeatedly adjacently locating a pair of surfaces with respect to one another and with respect to an intermediate coupling plane separating the surfaces, the apparatus having, in combination, mating balls and grooves respectively carried by the adjacent surfaces for kinematically coupling the surfaces with precision and repeatability at predetermined relative positions along said plane through sufficient points of contact between the balls and grooves to constrain the surfaces in the X and Y directions within said planer and with the surfaces held separated from one another in the Z direction; one of the surfaces being translatably and guidingly movable purely in the Z direction, there being provided one of flexural, rolling and sliding bearing elements adapted to enable the surfaces to be clamped into intimate contact with one another in response to bearing-controlled translational movement in the Z direction, while maintaining the X, Y locations of the surfaces free of positional and parasitic error motions between the surfaces, and in which the grooves are disposed in one surface of the kinematic coupling held fixed, and the balls of the other surface are located in a limited motion range press-fit die-set bushing allowing motion in the Z direction normal to the coupling plane.

11. Kinematic coupling apparatus for precisely and repeatably adjacently locating a pair of surfaces with respect to one another and with respect to an intermediate coupling plane separating the surfaces, the apparatus having, in combination, mating balls and grooves respectively carried by the adjacent surfaces for kinematically coupling the surfaces with precision and repeatability at predetermined relative positions along said plane through sufficient points of contact between the balls and grooves to constrain the surfaces in the X and Y directions within said plane, and with the surfaces held separated from one another in the Z direction; one of the surfaces being translatably and guidingly movable purely in the Z direction, there being provided one of flexural, rolling and sliding bearing elements adapted to enable the surfaces to be clamped into intimate contact with another in response to bearing-controlled translational movement in the Z direction, while maintaining the X, Y locations of the surfaces free of positional and parasitic error motions between the surfaces, and in which one surface serves as a lid for mating with a base surface, the lid surface being provided with three spherical kinematic coupling elements for mating with three flexure mounted grooves on the base, and in which clamping means is provided, operable after the lid is located with respect to the base, but not touching, by the spherical elements contacting the grooves for forcing the lid into sealing contact with the base.

12. Kinematic coupling apparatus for precisely and repeatably adjacently locating a pair of surfaces with respect to one another and with respect to an intermediate coupling plane separating the surfaces, the apparatus having, in combination, mating elements provided on the surfaces to couple the same to one another on opposite sides of the plane but without the surfaces touching, and guiding flexure means providing guiding compliance in the direction normal to the coupling plane to force the surfaces into intimate contact with a coupling action on the flexure means that causes pure translation in said normal direction without parasitic positional error motions.

13. A method of kinematically coupling objects having adjacent surfaces, that comprises, providing corresponding mating elements on the surfaces; coupling the surfaces on opposite sides of a coupling plane by mating the elements together, but without bringing the surfaces into touching contact; and clamping the mated surfaces into intimate contact by exerting a flexural guided coupling force providing pure relative translational movement of the surfaces in only the direction normal to the plane, and free of parasitic positional error motions.

14. A method as claimed in claim 13 and in which the mating coupling is effected by providing spherical elements on one surface each of which mates at two points of corresponding groove elements provided on the other surface.

15. A method as claimed in claim 14 and in which the clamping is controlled by one of flexural, rolling and sliding bearings positioned with one of the surfaces.

\* \* \* \* \*